US011533676B2

(12) United States Patent
Ye et al.

(10) Patent No.: US 11,533,676 B2
(45) Date of Patent: Dec. 20, 2022

(54) WIRELESS NETWORKING METHOD AND APPARATUS FOR AIR-CONDITIONING SYSTEM

(71) Applicant: Gree Electric Appliances, Inc. of Zhuhai, Guangdong (CN)

(72) Inventors: Huantao Ye, Guangdong (CN); Jie Tang, Guangdong (CN); Weiyou Yu, Guangdong (CN); Tieying Ye, Guangdong (CN); Quanzhou Liu, Guangdong (CN); Dongfeng Lai, Guangdong (CN); Du Yang, Guangdong (CN); Wencan Wang, Guangdong (CN); Zhongwen Deng, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 31 days.

(21) Appl. No.: 17/047,092

(22) PCT Filed: Dec. 7, 2018

(86) PCT No.: PCT/CN2018/119848
§ 371 (c)(1),
(2) Date: Oct. 13, 2020

(87) PCT Pub. No.: WO2019/196450
PCT Pub. Date: Oct. 17, 2019

(65) Prior Publication Data
US 2021/0153106 A1 May 20, 2021

(30) Foreign Application Priority Data
Apr. 13, 2018 (CN) .......................... 201810333791.8

(51) Int. Cl.
*H01H 19/00* (2006.01)
*H04W 48/16* (2009.01)
(Continued)

(52) U.S. Cl.
CPC ............ *H04W 48/16* (2013.01); *G06K 13/04* (2013.01); *H04L 12/2816* (2013.01);
(Continued)

(58) Field of Classification Search
None
See application file for complete search history.

(56) References Cited

U.S. PATENT DOCUMENTS

2005/0147073 A1* 7/2005 Hietalahti ............. H04W 48/16
370/338
2011/0248821 A1 10/2011 Merten
(Continued)

FOREIGN PATENT DOCUMENTS

CN 102750750 A 10/2012
CN 105091198 A * 11/2015
(Continued)

*Primary Examiner* — Sithu Ko
(74) *Attorney, Agent, or Firm* — The Webb Law Firm

(57) ABSTRACT

The present disclosure relates to a signal transmission method, system, device, a storage medium and an electronic device. The method includes: determining data to be transmitted by a unit in air conditioning units; and transmitting, by the unit, the data to be transmitted to other units through a designated power line in multiphase power lines, wherein the designated power line is any power line in the multiphase power lines, and the designated power line is a power line shared by all units in the air conditioning units.

11 Claims, 7 Drawing Sheets

(51) Int. Cl.
  *H04W 76/11* (2018.01)
  *G06K 13/04* (2006.01)
  *H04L 12/28* (2006.01)
  *H04W 84/12* (2009.01)

(52) U.S. Cl.
  CPC ....... *H04W 76/11* (2018.02); *H04L 2012/285* (2013.01); *H04L 2012/2841* (2013.01); *H04W 84/12* (2013.01)

(56) References Cited

U.S. PATENT DOCUMENTS

| | | | | |
|---|---|---|---|---|
| 2014/0129006 A1* | 5/2014 | Chen | ............... | G05B 15/02 |
| | | | | 700/90 |
| 2014/0247941 A1* | 9/2014 | Gu | ............... | H04W 12/50 |
| | | | | 380/270 |
| 2015/0223059 A1* | 8/2015 | Canpolat | ............... | H04W 48/18 |
| | | | | 726/7 |
| 2015/0327052 A1* | 11/2015 | Ghai | ............... | H04W 48/02 |
| | | | | 370/328 |
| 2016/0381631 A1* | 12/2016 | Cholas | ............... | H04W 76/10 |
| | | | | 370/338 |
| 2017/0213177 A1* | 7/2017 | Mandal | ............... | G06Q 50/06 |
| 2017/0272316 A1* | 9/2017 | Johnson | ............... | H04L 61/301 |
| 2018/0266719 A1* | 9/2018 | Kim | ............... | F24F 11/32 |
| 2019/0028294 A1 | 1/2019 | Daher et al. | | |

FOREIGN PATENT DOCUMENTS

| | | |
|---|---|---|
| CN | 105091198 A | 11/2015 |
| CN | 105184374 A | 12/2015 |
| CN | 107613544 A | 1/2018 |
| CN | 108616966 A | 10/2018 |
| WO | 2017123406 A1 | 7/2017 |

* cited by examiner

WIRELESS NETWORKING METHOD AND APPARATUS FOR AIR-CONDITIONING SYSTEM

CROSS-REFERENCE TO RELATED APPLICATIONS

This application is the United States national phase of International Application No. PCT/CN2018/119848 filed Dec. 7, 2018, and claims priority to Chinese Patent Application No. 201810333791.8 filed Apr. 13, 2018, the disclosures of which are hereby incorporated by reference in their entirety.

BACKGROUND OF THE INVENTION

Field of the Invention

The present disclosure relates to the field of air conditioners, and in particular to a wireless networking method and apparatus for an air conditioning system.

Description of Related Art

A traditional multi-split system is composed of an outdoor unit, indoor units, a handheld terminal and their interconnected communication lines. The system network communication is based on controller area network (CAN) communication, 485 communication, home bus system (HBS) communication and other wired communication methods.

SUMMARY OF THE INVENTION

According to one aspect of the present disclosure, a wireless networking method for an air conditioning system is provided. The method comprises: reading, by an outdoor unit of the air conditioning system, a punched card to obtain first identification information of the outdoor unit represented by a punched card code on the punched card; acquiring, by the outdoor unit, a connection request to connect to a wireless local area network (LAN) of the outdoor unit, which is sent by a device to be networked; obtaining, by the outdoor unit, second identification information contained in the connection request according to the connection request, wherein the device to be networked obtains the second identification information via the punched card; and connecting, by the outdoor unit, the device to be networked to the wireless LAN if it is verified that the second identification information matches with the first identification information.

According to another aspect of the present disclosure, another wireless networking method for an air conditioning system is provided. The method comprises: reading, by a device to be networked of the air conditioning system, a punched card to obtain first identification information represented by a punched card code on the punched card; sending, by the device to be networked, a connection request to the wireless LAN of the outdoor unit of the air conditioning system according to the first identification information, wherein the connection request is used to request to connect to the wireless LAN of the outdoor unit, the connection request containing the first identification information; and if the outdoor unit verifies that the first identification information matches with the second identification information, connecting the device to be networked to the wireless LAN, wherein the second identification information is identification information of the outdoor unit represented by a punched card code on a punched card and obtained by the outdoor unit reading the punched card.

According to still another aspect of the present disclosure, a wireless networking apparatus for an air conditioning system is provided. The apparatus comprises: a first reading unit configured to cause an outdoor unit of the air conditioning system to read a punched card to obtain first identification information of the outdoor unit represented by a punched card code on the punched card; a first obtaining unit configured to cause the outdoor unit to obtain a connection request sent by a device to be networked, the connection request being used to request to connect to a wireless LAN of the outdoor unit; a second obtaining unit configured to cause the outdoor unit to obtain second identification information contained in the connection request according to the connection request, wherein the device to be networked obtains the second identification information via the punched card; and a first connection unit configured to cause the outdoor unit to connect the device to be networked to the wireless LAN if it is verified that the second identification information matches with the first identification information.

According to still another aspect of the present disclosure, another wireless networking apparatus for an air conditioning system is provided. The apparatus comprises: a second reading unit configured to cause a device to be networked of the air conditioning system to read a punched card to obtain second identification information represented by a punched card code on the punched card; a sending unit configured to cause the device to be networked to send a connection request to the wireless LAN of the outdoor unit of the air conditioning system according to the second identification information, wherein the connection request is used to request to connect to the wireless LAN of the outdoor unit, the connection request containing the second identification information; and a second connection unit configured to, if the outdoor unit verifies that the second identification information matches with the first identification information, cause the device to be networked to connect to the wireless LAN, wherein the first identification information is identification information of the outdoor unit represented by a punched card code on a punched card and obtained by the outdoor unit reading the punched card.

According to another aspect of the present disclosure, a storage medium comprising a program stored thereon is provided, wherein the program executes any one of the above wireless networking methods for an air conditioning system.

According to another aspect of the present disclosure, a processor for executing a program is provided, wherein the program executes any one of the above wireless networking methods for an air conditioning system.

BRIEF DESCRIPTION OF THE DRAWINGS

The accompanying drawings constituting a part of this disclosure are used to provide a further understanding of the present disclosure. The illustrative embodiments of the present disclosure and their description serve to explain the present disclosure, but are not limitation thereof. In the drawings.

DESCRIPTION OF THE INVENTION

Figure 1:
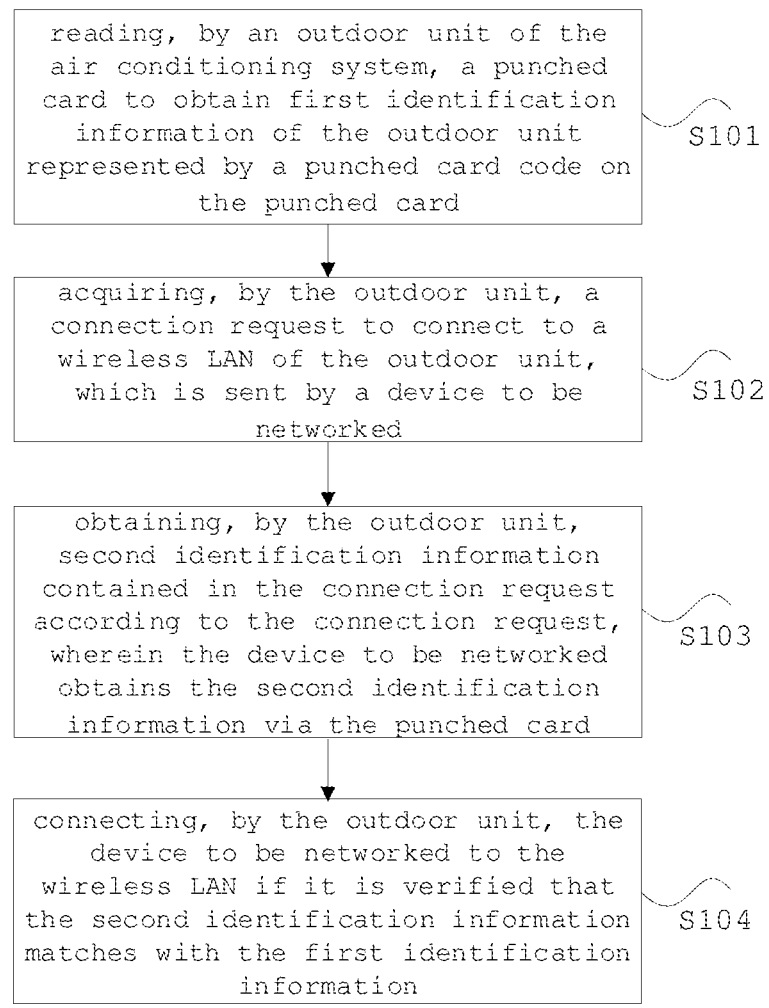
FIG. 1 is a flowchart of a wireless networking method for an air conditioning system according to Embodiment 1 of the present disclosure.

It should be noted that, in the case of no conflict, the embodiments and the features of the embodiments of the present disclosure are able to be combined with each other. Hereinafter, the present disclosure will be described in detail with reference to the drawings and in conjunction with embodiments.

In order to enable those skilled in the art to get a better understanding of the solutions of the present disclosure, the technical solutions of the embodiments of the present disclosure will be described clearly and completely in conjunction with the drawings of the embodiments of the present disclosure. Obviously, merely some embodiments of the present disclosure, rather than all embodiments thereof, are given herein. All other embodiments obtained by those of ordinary skill in the art based on the embodiments of the present disclosure without creative efforts shall fall within the protection scope of the present disclosure.

It should be noted that the terms "first", "second" and the like in the description and claims of the present disclosure and the drawings are used to distinguish similar objects, and are not necessarily used to describe a specific order or sequence. It should be understood that, in some embodiments, the terms used in this way are interchanged under appropriate circumstances, so that the embodiments of the present disclosure described herein is implemented in an order other than those illustrated or described herein. Furthermore, the terms "comprising" and "having" and any of their variations are intended to cover non-exclusive inclusions, for example, a process, method, system, product, or device that comprises a series of steps or units need not be limited to those explicitly listed, instead it comprise other steps or units not explicitly listed or inherent to this process, method, product or device.

The wired communication network systems are sophisticated and reliable systems. However, the wiring of the wired communication network system is complicated, difficult to maintain, and easy to be damaged by insects, which adds a huge workload to after-sales maintenance workers. On the other hand, due to the impedance of the communication lines, there are many design bottlenecks to design engineers, which cause the product to fail to achieve the expected effect in some cases.

As for the problem of difficulty in installation and wiring and difficulty in service maintenance of multi-split units with wired communication in the related art, no effective solution has been proposed yet.

The present disclosure provides a wireless networking method and apparatus for an air conditioning system to solve the problem of difficulty in installation and wiring and difficulty in service maintenance of multi-split units with wired communication in the related art.

In this disclosure, the following steps are adopted to solve the problem of difficult installation and wiring and difficult service maintenance of multi-split units with wired communication in the related art: reading, by an outdoor unit of the air conditioning system, a punched card to obtain first identification information of the outdoor unit represented by a punched card code on the punched card; acquiring, by the outdoor unit, a connection request sent by a device to be networked, the connection request being used to request to connect to a wireless LAN of the outdoor unit; obtaining, by the outdoor unit, second identification information contained in the connection request according to the connection request, wherein the device to be networked obtains the second identification information via the punched card; and connecting, by the outdoor unit, the device to be networked to the wireless LAN if it is verified that the second identification information matches with the first identification information. Furthermore, a technical effect of quickly and accurately establishing a wireless communication network for an air conditioning system by using punched cards is achieved.

Embodiment 1

According to Embodiment 1 of the present disclosure, a wireless networking method for an air conditioning system is provided.

FIG. 1 is a flowchart of a wireless networking method for an air conditioning system according to Embodiment 1 of the present disclosure. As shown in FIG. 1, the method comprises the following steps:

Step S101: reading, by an outdoor unit of the air conditioning system, a punched card to obtain first identification information of the outdoor unit represented by a punched card code on the punched card;

Step S102: acquiring, by the outdoor unit, a connection request sent by a device to be networked, the connection request being used to request to connect to a wireless LAN of the outdoor unit;

Step S103: obtaining, by the outdoor unit, second identification information contained in the connection request according to the connection request, wherein the device to be networked obtains the second identification information via the punched card;

Step S104: connecting, by the outdoor unit, the device to be networked to the wireless LAN if it is verified that the second identification information matches with the first identification information.

In the wireless networking method for an air conditioning system provided in Embodiment 1 of the disclosure, the problem of difficulty in installation and wiring and difficulty in service maintenance of multi-split units with wired communication in the related art are solved through reading, by an outdoor unit of the air conditioning system, a punched card to obtain first identification information of the outdoor unit represented by a punched card code on the punched card; acquiring, by the outdoor unit, a connection request sent by a device to be networked, the connection request being used to request to connect to a wireless LAN of the outdoor unit; obtaining, by the outdoor unit, second identification information contained in the connection request according to the connection request, wherein the device to be networked obtains the second identification information via the punched card; and connecting, by the outdoor unit, the device to be networked to the wireless LAN if it is verified that the second identification information matches with the first identification information. By acquiring the first identification information of the outdoor unit and the second identification information of the device to be networked, and connecting the device to be networked to the wireless LAN if the first identification information matches with second identification information, an effect of quickly and accurately establishing the wireless communication network of the air conditioning system are achieved. This avoids the inability to accurately determine the device to be connected to the wireless LAN due to too many outdoor units and devices to be networked, avoiding the occurrence of a situation in which the device to be networked cannot accurately determine the recipient to which the connection request is sent, and the outdoor unit cannot accurately determine whether the device to be networked from which the request is sent meets a criterion for connecting to the wireless LAN.

It should be noted that the outdoor unit obtains the first identification information from a punched card, and the device to be networked also obtains the second identification information from a punched card. That is to say, a technical effect of quickly and accurately establishing a wireless communication network for an air conditioning system by using punched cards is achieved in the present disclosure.

Figure 7:
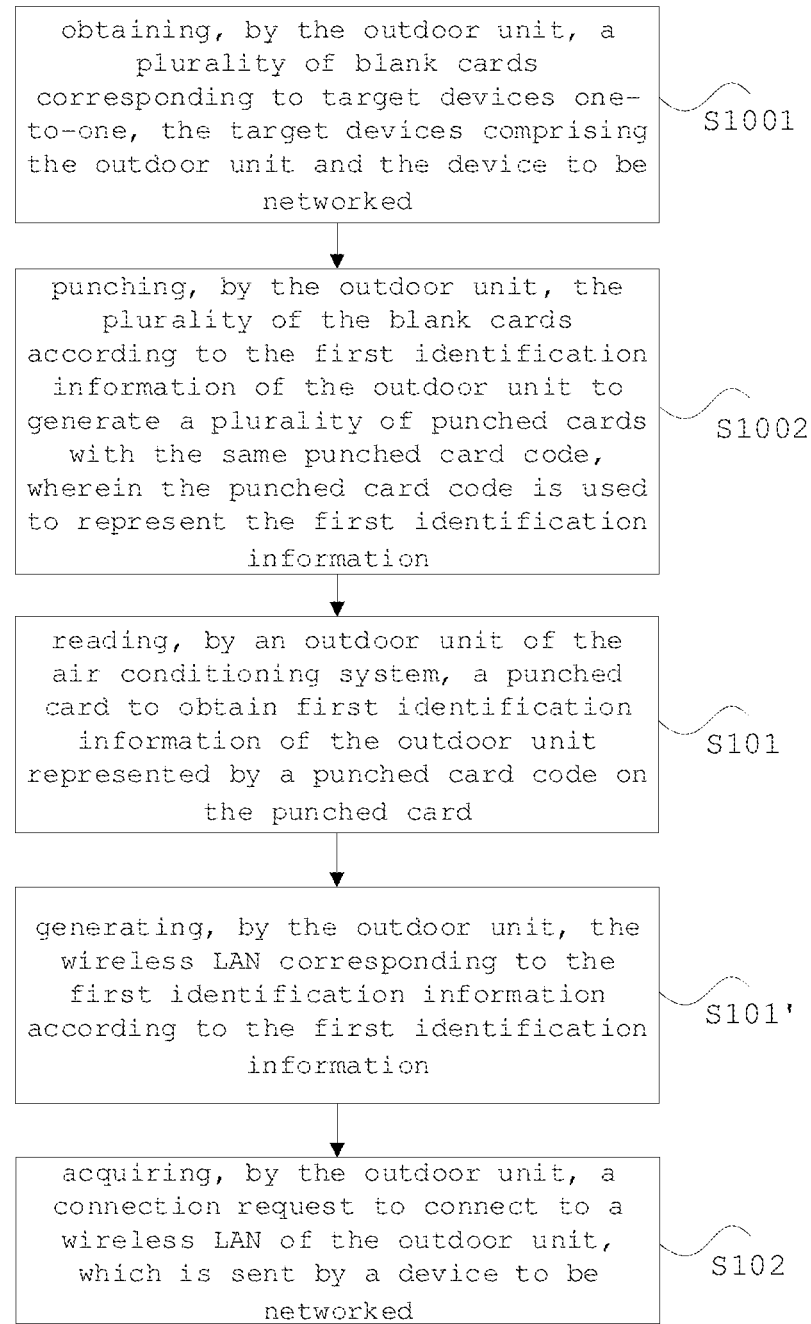
FIG. 7 is another flowchart of a wireless networking method for an air conditioning system according to Embodiment 1 of the present disclosure.

FIG. 7 is another flowchart of a wireless networking method for an air conditioning system according to Embodiment 1 of the present disclosure. In order to enable target devices connected to the same wireless LAN to accurately locate each other, in some embodiments, in the wireless networking method for an air conditioning system provided in Embodiment 1 of the present disclosure, the method comprises steps before obtaining a punched card by the outdoor unit of the air conditioning system: obtaining a plurality of blank cards by the outdoor unit, wherein the plurality of blank cards correspond to target devices one-to-one, the target devices comprising the outdoor unit and devices to be networked (S1001); and punching, by the outdoor unit, the plurality of the blank cards according to the first identification information of the outdoor unit to generate a plurality of punched cards with the same punched card code, wherein the punched card code is used to represent the first identification information (S1002).

With a mechanical port of the outdoor unit, a plurality of blank cards are punched according to the first identification information to generate a plurality of punched cards with the same punched card code, which are then be read by target devices to be connected to the same wireless LAN (the outdoor unit and a device to be networked) to obtain the same first identification information. This allows the target devices to accurately determine the wireless LAN to be connected, avoiding a situation in which a device to be networked cannot accurately determine the recipient of the connection request, and the outdoor unit cannot accurately determine whether the device to be networked from which the request is sent meets a criterion for connecting to the wireless LAN, that will otherwise occur due to too many devices to be connected to the wireless LAN.

That is to say, through reading punched cards with the same punched card code by the outdoor unit and the device to be networked, identification information is synchronized between the outdoor unit and the device to be networked, thereby achieving the technical effect that the outdoor unit and the device to be networked are able to accurately locate each other.

It should be noted that when it is required to change the wireless LAN to be connected for the device to be networked, only the punched card read by the device to be networked needs to be replaced.

In order to enable the device to be networked to accurately locate the outdoor unit, that is, to enable the device to be networked to accurately send the connection request to the outdoor unit, in some embodiments, in the wireless networking method for an air conditioning system provided in Embodiment 1 of the present disclosure, the method further comprises steps after reading the punched card by the outdoor unit of the air conditioning system: generating, by the outdoor unit, the wireless LAN corresponding to the first identification information according to the first identification information (S101').

Through generating the wireless LAN corresponding to the first identification information by the outdoor unit, and obtaining the first identification information from the punched card by the device to be networked, the device to be networked is able to match the first identification information of the wireless LAN with the first identification information of the punched card to achieve the technical effect of accurately locating the wireless LAN of the outdoor unit, and accurately sending the connection request to the outdoor unit corresponding to the device to be networked through the wireless LAN, avoiding the occurrence of sending the connection request to an error recipient.

It should be noted that in order to avoid a situation that a plurality of outdoor units have the same first identification information, resulting that a device to be networked cannot accurately determine the wireless LAN to be connected, in some embodiments, in the wireless networking method for an air conditioning system provided in Embodiment 1 of the present disclosure, the first identification information of the outdoor unit uniquely corresponds to the outdoor unit.

In some embodiments, connecting, by the outdoor unit, the device to be networked to the wireless LAN if it is verified that the second identification information matches with the first identification information comprises: connecting, by the outdoor unit, the device to be networked to the wireless LAN if it is verified that the second identification information is the same as the first identification information. Thereby, it achieves a technical effect that the outdoor unit is able to quickly determine whether the device to be networked from which the connection request is sent matches with the outdoor unit, and quickly establish a wireless network between the outdoor unit and the device to be networked if matching.

What needs to be considered is that, in some embodiments, the device to be networked comprise a plurality of sub-devices.

In view of the above situation, in some embodiments, in the wireless networking method for an air conditioning system provided in Embodiment 1 of the present disclosure, the device to be networked comprises a plurality of sub-devices, and connecting the device to be networked to the wireless LAN by the outdoor unit if it is verified that the second identification information matches with the first identification information comprises: sequentially determining, by the outdoor unit, whether the second identification information of the plurality of sub-devices is the same as the first identification information; and sequentially connecting the plurality of sub-devices to the wireless LAN if it is verified that the second identification information of the plurality of sub-devices is the same as the first identification information. Through determining by the outdoor unit based on the second identification information in the connection request sent from the plurality of sub-devices of the device to be network, sub-devices with the same second identification information as the first identification information are verified, and then are connected to the wireless LAN one by one. Thereby, a technical effect of accurately establishing the wireless network connection between the outdoor unit and a plurality of sub-devices of the device to be networked is achieved.

It should be noted that, in some cases, the steps shown in the flowchart are performed in a computer system that executes a set of computer-executable instructions. Although a logical sequence is shown in the flowchart, in some cases, the steps shown or described are performed in an order different from that shown herein.

A wireless networking apparatus for an air conditioning system is further provided in Embodiment 1 of the present disclosure. It should be noted that, in some cases, the wireless networking apparatus for an air conditioning system in Embodiment 1 of this disclosure are used to execute the wireless networking method for an air conditioning system provided in Embodiment 1 of this disclosure. The wireless networking apparatus for an air conditioning system provided in Embodiment 1 of the present disclosure will be introduced below.

Figure 2:
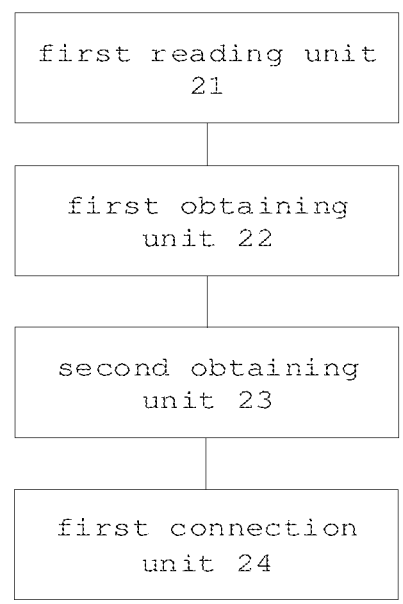
FIG. 2 is a schematic diagram of a wireless networking apparatus for an air conditioning system according to Embodiment 1 of the present disclosure.

FIG. 2 is a schematic diagram of a wireless networking apparatus for an air conditioning system according to Embodiment 1 of the present disclosure. As shown in FIG. 2, the apparatus comprises: a first reading unit 21, a first obtaining unit 22, a second obtaining unit 23, and a first connection unit 24.

The first reading unit 21 is configured to cause an outdoor unit of the air conditioning system to read a punched card to obtain first identification information of the outdoor unit represented by a punched card code on the punched card.

The first obtaining unit 22 is configured to cause the outdoor unit to obtain a connection request sent by a device to be networked, the connection request being used to request to connect to a wireless LAN of the outdoor unit.

The second obtaining unit 23 is configured to cause the outdoor unit to obtain second identification information contained in the connection request according to the connection request, wherein the device to be networked obtains the second identification information via the punched card.

The first connection unit 24 is configured to cause the outdoor unit to connect the device to be networked to the wireless LAN if it is verified that the second identification information matches with the first identification information.

In some embodiments, in the wireless networking apparatus for an air conditioning system provided in Embodiment 1 of the present disclosure, the apparatus further comprises: a first generation unit configured to cause the outdoor unit to generate a wireless LAN corresponding to the first identification information according to the first identification information after the outdoor unit of the air conditioning system reads the punched card.

In some embodiments, in the wireless networking apparatus for an air conditioning system provided in Embodiment 1 of the present disclosure, the apparatus comprises: a third obtaining unit configured to cause the outdoor unit to obtain a plurality of blank cards before the outdoor unit of the air conditioning system reads the punched card, wherein the plurality of blank cards correspond to target devices one-to-one, the target devices comprising the outdoor unit and the device to be networked; and a second generation unit configured to cause the outdoor unit to punch the plurality of the blank cards according to the first identification information of the outdoor unit to generate a plurality of punched cards with the same punched card code, wherein the punched card code is used to represent the first identification information.

In some embodiments, in the wireless networking apparatus for an air conditioning system provided in Embodiment 1 of the present disclosure, the first connection unit 24 comprises: a connection module configured to cause the outdoor unit to connect the device to be networked to the wireless LAN if it is verified that the second identification information is the same as the first identification information.

In some embodiments, in the wireless networking apparatus for an air conditioning system provided in Embodiment 1 of the present disclosure, the device to be networked comprises a plurality of sub-devices, the connection module comprising: a determination sub-module configured to cause the outdoor unit to sequentially determine whether the second identification information of the plurality of sub-devices is the same as the first identification information; and a connection sub-module configured to sequentially connect the plurality of sub-devices to the wireless LAN if it is verified that the second identification information of the plurality of sub-devices is the same as the first identification information.

In the wireless networking apparatus for an air conditioning system provided in Embodiment 1 of the disclosure, the problem of difficulty in installation and wiring and difficulty in service maintenance of multi-split units with wired communication in the related art are solved through causing, by the first reading unit 21, an outdoor unit of the air conditioning system to read a punched card to obtain first identification information of the outdoor unit represented by a punched card code on the punched card; causing, by first obtaining unit 22, the outdoor unit to obtain a connection request sent by a device to be networked, the connection request being used to request to connect to a wireless LAN of the outdoor unit; causing, by the second obtaining unit 23, the outdoor unit to obtain second identification information contained in the connection request according to the connection request, wherein the device to be networked obtains the second identification information via the punched card; and causing, by the first connection unit 24, the outdoor unit to connect the device to be networked to the wireless LAN if it is verified that the second identification information matches with the first identification information.

The wireless networking apparatus for an air conditioning system comprises a processor and a memory. The first reading unit 21, the first obtaining unit 22, the second obtaining unit 23, and the first connection unit 24 described above are stored as program units in the memory. The processor executes the program units stored in the memory to realize the corresponding functions.

The processor comprises a kernel, which calls the corresponding program units from the memory. In some embodiments, one or more kernels are provided and the wireless communication network of the air conditioning system is quickly and accurately established by adjusting the kernel parameters.

In some embodiments, the memory comprises at least one of a non-permanent memory, a random access memory (RAM) or a non-volatile memory in a computer-readable medium, such as read only memory (ROM) or flash RAM. The memory comprises at least one memory chip.

Embodiment 2

According to Embodiment 2 of the present disclosure, another wireless networking method for an air conditioning system is provided.

Figure 3:
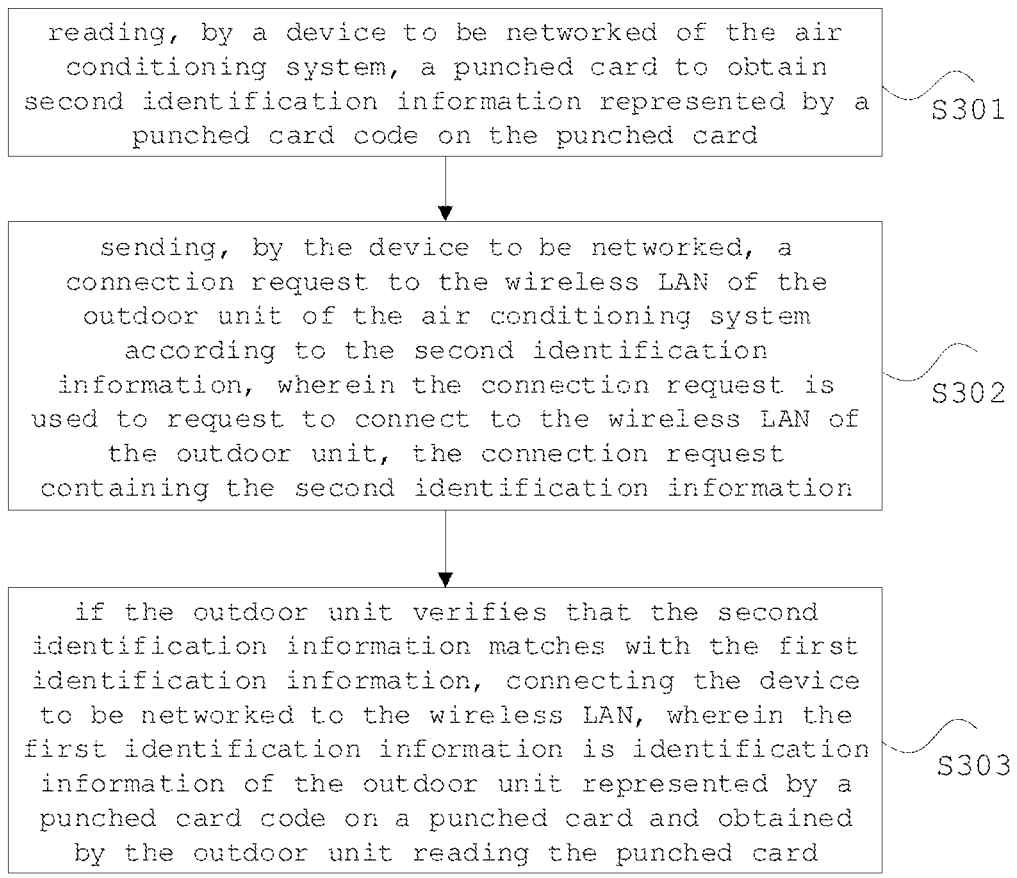
FIG. 3 is a flowchart of a wireless networking method for an air conditioning system according to Embodiment 2 of the present disclosure.

FIG. 3 is a flowchart of a wireless networking method for an air conditioning system according to Embodiment 2 of the present disclosure. As shown in FIG. 3, the method comprises the following steps:

Step S301: reading, by a device to be networked of the air conditioning system, a punched card to obtain first identification information represented by a punched card code on the punched card;

Step S302: sending, by the device to be networked, a connection request to the wireless LAN of the outdoor unit of the air conditioning system according to the first identification information, wherein the connection request is used to request to connect to the wireless LAN of the outdoor unit, the connection request containing the first identification information;

Step S303: if the outdoor unit verifies that the first identification information matches with the second identification information, connecting the device to be networked to the wireless LAN, wherein the second identification information is identification information of the outdoor unit represented by a punched card code on a punched card and obtained by the outdoor unit reading the punched card.

It should be noted that the outdoor unit generates the wireless LAN corresponding to the second identification information according to the second identification information, that is, the wireless LAN corresponds to the second identification information.

In the wireless networking method for an air conditioning system provided in Embodiment 2 of the disclosure, the problem of difficulty in installation and wiring and difficulty in service maintenance of multi-split units with wired communication in the related art is solved through reading, by a device to be networked of the air conditioning system, a punched card to obtain first identification information represented by a punched card code on the punched card; sending, by the device to be networked, a connection request to the wireless LAN of the outdoor unit of the air conditioning system according to the first identification information, wherein the connection request is used to request to connect to the wireless LAN of the outdoor unit, the connection request containing the first identification information; and if the outdoor unit verifies that the first identification information matches with the second identification information, connecting the device to be networked to the wireless LAN, wherein the second identification information is identification information of the outdoor unit represented by a punched card code on a punched card and obtained by the outdoor unit reading the punched card. Through obtaining the second identification information by the outdoor unit according to a punched card, obtaining the first identification information by the device to be networked according to a punched card, determining by the device to be networked the wireless LAN of the outdoor unit according to the first identification information, and sending request information containing the first identification information to the wireless LAN, so that the outdoor unit is able to determine whether the second identification information matches with the first identification information, and then enable the device to be networked to be connected to the wireless network, that is, the device to be networked is enabled to obtain the first identification information according to the punched card, determine the wireless LAN of the outdoor unit according to the first identification information, and send request information containing the first identification information for verification to the wireless LAN, achieving an effect of quickly and accurately establishing the wireless communication network of the air conditioning system by using punched cards.

That is to say, through reading punched cards with the same punched card code by the outdoor unit and the device to be networked, identification information is synchronized between the outdoor unit and the device to be networked, thereby achieving the technical effect that the outdoor unit and the device to be networked are able to accurately locate each other.

It should be noted that, in some cases, the steps shown in the flowchart are performed in a computer system that executes a set of computer-executable instructions. Although a logical sequence is shown in the flowchart, in some cases, the steps shown or described are performed in an order different from that shown herein.

A wireless networking apparatus for an air conditioning system is further provided in Embodiment 2 of the present disclosure. It should be noted that, in some embodiments, the wireless networking apparatus for an air conditioning system in Embodiment 2 of this disclosure are used to execute the wireless networking method for an air conditioning system provided in Embodiment 2 of this disclosure. The wireless networking apparatus for an air conditioning system provided in Embodiment 2 of the present disclosure will be introduced below.

Figure 4:
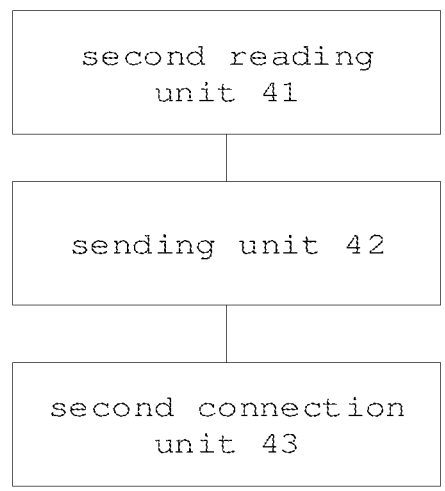
FIG. 4 is a schematic diagram of a wireless networking apparatus for an air conditioning system according to Embodiment 2 of the present disclosure.

FIG. 4 is a schematic diagram of a wireless networking apparatus for an air conditioning system according to Embodiment 2 of the present disclosure. As shown in FIG. 4, the apparatus comprises: a second reading unit 41, a sending unit 42, and a second connection unit 43.

The second reading unit 41 is configured to cause a device to be networked of the air conditioning system to read a punched card to obtain first identification information represented by a punched card code on the punched card.

The sending unit 42 is configured to cause the device to be networked to send a connection request to the wireless LAN of the outdoor unit of the air conditioning system according to the first identification information, wherein the connection request is used to request to connect to the wireless LAN of the outdoor unit, the connection request containing the first identification information.

The second connection unit 43 is configured to, if the outdoor unit verifies that the first identification information matches with the second identification information, cause the device to be networked to connect to the wireless LAN, wherein the second identification information is identification information of the outdoor unit represented by a punched card code on a punched card and obtained by the outdoor unit reading the punched card.

In the wireless networking method for an air conditioning system provided in Embodiment 2 of the disclosure, the problem of difficulty in installation and wiring and difficulty in service maintenance of multi-split units with wired communication in the related art is solved through causing, by the second reading unit 41, a device to be networked of the air conditioning system to read a punched card to obtain first identification information represented by a punched card code on the punched card; causing, by the sending unit 42, the device to be networked to send a connection request to the wireless LAN of the outdoor unit of the air conditioning system according to the first identification information, wherein the connection request is used to request to connect to the wireless LAN of the outdoor unit, the connection request containing the first identification information; and if the outdoor unit verifies that the first identification information matches with the second identification information, causing, by the second connection unit 43, the device to be networked to be connected to the wireless LAN, wherein the second identification information is identification information of the outdoor unit represented by a punched card code on a punched card and obtained by the outdoor unit reading the punched card, thereby achieving an effect of quickly and accurately establishing the wireless communication network of the air conditioning system by using punched cards.

The wireless networking apparatus for an air conditioning system comprises a processor and a memory. The second reading unit 41, the sending unit 42, and the second connection unit 43 described above are stored as program units in the memory. The processor executes the program units stored in the memory to realize the corresponding functions.

The processor comprises a kernel, which calls the corresponding program units from the memory. In some embodiments, one or more kernels are provided and the wireless communication network of the air conditioning system is quickly and accurately established by adjusting the kernel parameters.

In some embodiments, the memory comprises at least one of non-permanent memory, random access memory (RAM) or non-volatile memory in a computer-readable medium, such as read only memory (ROM) or flash RAM. The memory comprises at least one memory chip.

Embodiment 3

Figure 5:
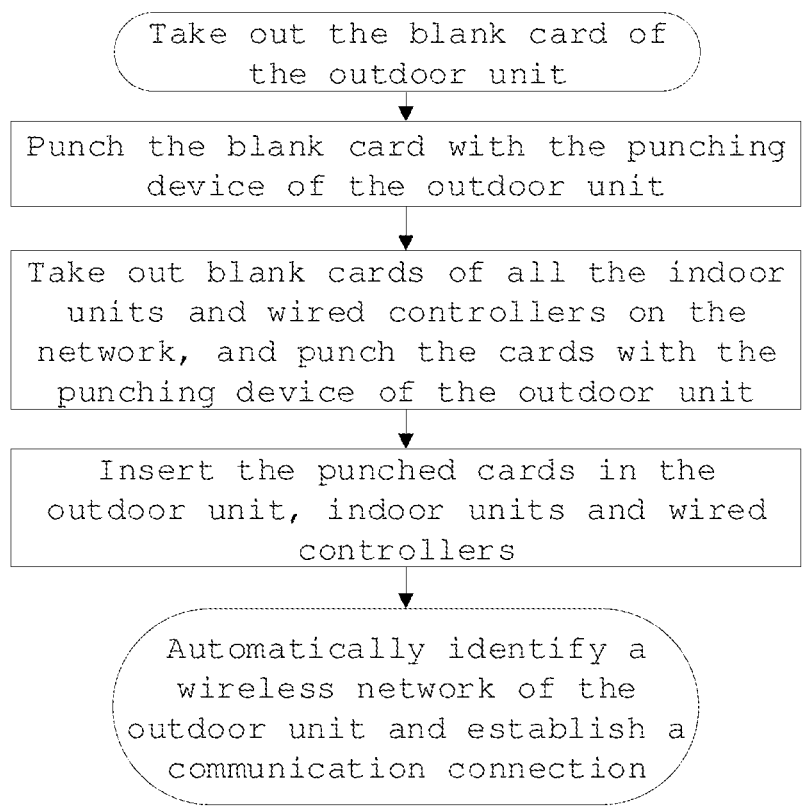
FIG. 5 is another flowchart of a wireless networking method for an air conditioning system according to Embodiment 3 of the present disclosure.
Figure 6:
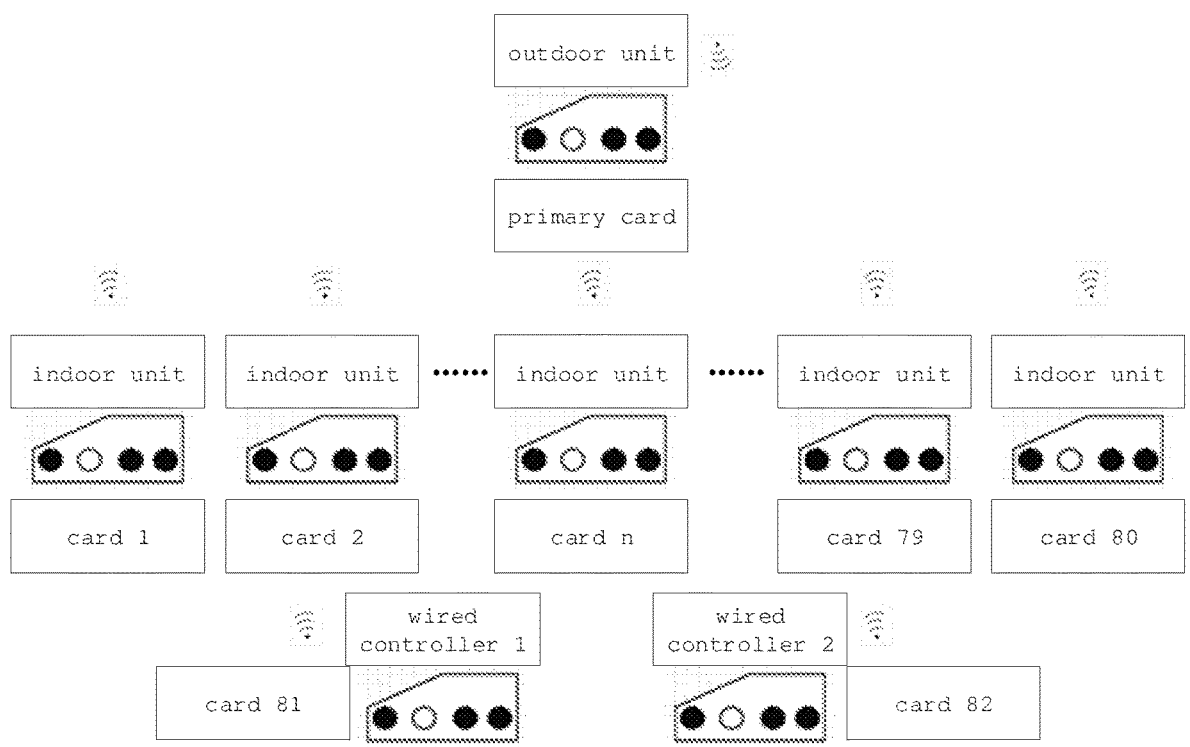
FIG. 6 is a schematic diagram of punched cards of a wireless networking method for an air conditioning system according to Embodiment 3 of the present disclosure.

Embodiment 3 is a wireless networking method for multi-split units, in which the outdoor unit has its own interface configured to punch blank cards, and the outdoor unit has the function of establishing a wireless LAN. That is, the outdoor unit has a WIFI module. The indoor units and wired controllers are also provided with WIFI modules, the outdoor unit, the indoor units and the wired controllers corresponding to their blank card respectively. As shown in FIG. 5, the specific steps of Embodiment 3 are as follows:

① Before the installation process, the installer takes out the blank cards of the outdoor unit, punches the blank cards with the mechanical port of the outdoor unit, and the punched holes and the ID of the outdoor unit uniquely correspond to a code. Then, blank cards reserved in the sockets of the wired controllers of the indoor units are taken out and punched with the mechanical port of the outdoor unit in a manner consistent with that of punching the card for the outdoor unit of the same network system. Then, the cards are inserted into the sockets of the indoor units and the wired controllers as shown in FIG. 6.

② In power-on test, the main board of the outdoor unit reads ID information on the card, and informs a PLC module via a serial port, so that the PLC module will establish a unique network. At the same time, the indoor units and the wired controllers with punched cards inserted automatically connect to the network system they belong to according to the uniqueness of the punched code.

That is, in Embodiment 3, wireless networking of the indoor units, outdoor unit and wired controllers is implemented with a physical punching method, and convenience, accuracy, and reliability of the wireless network are guaranteed without using special equipment. A problem that wireless multi-split units cannot be easily and reliably connected to the network is solved, and wireless communication of multi-split units is realized.

Some embodiments of the present disclosure provide a storage medium on which a program is stored, which when executed by a processor, implements the wireless networking method for an air conditioning system.

Some embodiments of the present disclosure provide a processor for executing a program, which when executed implements the wireless networking method for an air conditioning system.

Figure 8:
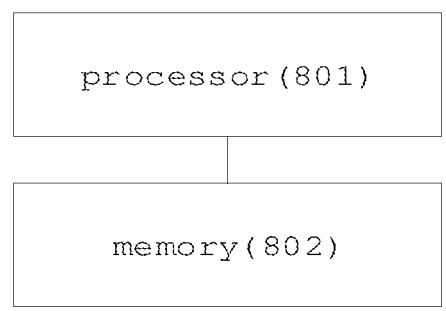
FIG. 8 is a schematic diagram of another wireless networking apparatus for an air conditioning system.

FIG. 8 is a schematic diagram of another wireless networking apparatus for an air conditioning system. Some embodiments of the apparatus comprising a processor (801), a memory (802), and a program stored in the memory and executable by the processor, which when executing the program implements the following steps: reading, by an outdoor unit of the air conditioning system, a punched card to obtain first identification information of the outdoor unit represented by a punched card code on the punched card; acquiring, by the outdoor unit, a connection request sent by a device to be networked, the connection request being used to request to connect to a wireless LAN of the outdoor unit; obtaining, by the outdoor unit, second identification information contained in the connection request according to the connection request, wherein the device to be networked obtains the second identification information via the punched card; and connecting, by the outdoor unit, the device to be networked to the wireless LAN if it is verified that the second identification information matches with the first identification information.

In some embodiments, the method further comprises steps after reading the punched card by the outdoor unit of the air conditioning system: generating, by the outdoor unit, the wireless LAN corresponding to the first identification information according to the first identification information.

In some embodiments, the method further comprises steps before reading the punched card by the outdoor unit of the air conditioning system: obtaining a plurality of blank cards by the outdoor unit, wherein the plurality of blank cards correspond to target devices one-to-one, the target devices comprising the outdoor unit and devices to be networked; and punching, by the outdoor unit, the plurality of the blank cards according to the first identification information of the outdoor unit to generate a plurality of punched cards with the same punched card code, wherein the punched card code is used to represent the first identification information.

In some embodiments, connecting, by the outdoor unit, the device to be networked to the wireless LAN if it is verified that the second identification information matches with the first identification information comprises: connecting, by the outdoor unit, the device to be networked to the wireless LAN if it is verified that the second identification information is the same as the first identification information.

In some embodiments, the device to be networked comprises a plurality of sub-devices, and connecting, by the outdoor unit, the device to be networked to the wireless LAN if it is verified that the second identification information is the same as the first identification information comprises: sequentially determining, by the outdoor unit, whether the second identification information of the plurality of sub-devices is the same as the first identification information; and sequentially connecting the plurality of sub-devices to the wireless LAN if it is verified that the second identification information of the plurality of sub-devices is the same as the first identification information. In some embodiments, the device herein is a server, a personal computer (PC), a portable apple device (PAD), or a mobile phone, etc.

This disclosure further provides a computer program product, which when executed on a data processing device, is suitable for executing a program that initializes the following method steps: reading, by an outdoor unit of the air conditioning system, a punched card to obtain first identification information of the outdoor unit represented by a punched card code on the punched card; acquiring, by the outdoor unit, a connection request sent by a device to be networked, the connection request being used to request to connect to a wireless LAN of the outdoor unit; obtaining, by the outdoor unit, second identification information contained in the connection request according to the connection request, wherein the device to be networked obtains the second identification information via the punched card; and connecting, by the outdoor unit, the device to be networked to the wireless LAN if it is verified that the second identification information matches with the first identification information.

In some embodiments, the method further comprises steps after reading the punched card by the outdoor unit of the air conditioning system: generating, by the outdoor unit, the wireless LAN corresponding to the first identification information according to the first identification information.

In some embodiments, the method further comprises steps before reading the punched card by the outdoor unit of the air conditioning system: obtaining a plurality of blank cards by the outdoor unit, wherein the plurality of blank cards correspond to target devices one-to-one, the target devices comprising the outdoor unit and devices to be networked; punching, by the outdoor unit, the plurality of the blank cards according to the first identification information of the outdoor unit to generate a plurality of punched cards with the same punched card code, wherein the punched card code is used to represent the first identification information.

In some embodiments, connecting, by the outdoor unit, the device to be networked to the wireless LAN if it is verified that the second identification information matches with the first identification information comprises: connecting, by the outdoor unit, the device to be networked to the wireless LAN if it is verified that the second identification information is the same as the first identification information.

In some embodiments, the device to be networked comprises a plurality of sub-devices, and connecting, by the outdoor unit, the device to be networked to the wireless LAN if it is verified that the second identification information is the same as the first identification information comprises: sequentially determining, by the outdoor unit, whether the second identification information of the plurality of sub-devices is the same as the first identification information; and sequentially connecting the plurality of sub-devices to the wireless LAN if it is verified that the second identification information of the plurality of sub-devices is the same as the first identification information.

One skilled in the art should understand that, in some cases, the embodiments of the present disclosure are provided as a method, a system, or a computer program product. Therefore, in some cases, embodiments of the present disclosure take the form of entirely hardware embodiments, entirely software embodiments or embodiments containing both hardware and software elements. Moreover, in some cases, the present disclosure is in a form of one or more computer program products containing the computer-executable codes which are implemented in the computer-executable storage medium (comprising but not limited to disks, compact disc read-only memory (CD-ROM), optical disks, etc.).

The present disclosure is described with reference to flowcharts or block diagrams of methods, apparatuses (systems) and computer program products according to embodiments of the present disclosure. It should be understood that, in some embodiments, each process or block in the flowcharts or block diagrams, and combinations of the processes or blocks in the flowcharts or block diagrams are implemented by computer program instructions. In some embodiments, the computer program instructions are provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts or one or more blocks of the block diagrams.

In some embodiments, the computer program instructions are also stored in a computer readable memory device capable of directing a computer or other programmable data processing device to operate in a specific manner such that the instructions stored in the computer readable memory device produce an article of manufacture comprising instruction means implementing the functions specified in one or more flows of the flowcharts or one or more blocks of the block diagrams.

In some embodiments, these computer program instructions are also loaded onto a computer or other programmable device to perform a series of operation steps on the computer or other programmable device to generate a computer-implemented process such that the instructions executed on the computer or other programmable device provide steps implementing the functions specified in one or more flows of the flowcharts or one or more blocks of the block diagrams.

In a typical configuration, the computing device comprises one or more processors (CPU), input/output interfaces, network interfaces, and memory.

In some embodiments, the memory comprises at least one of a non-permanent memory, a random access memory (RAM) or a non-volatile memory in a computer-readable medium, such as read only memory (ROM) or flash RAM. The memory is an example of a computer-readable medium.

In some embodiments, computer-readable media comprise permanent and non-permanent, removable and non-removable media, and information storage realized by any method or technology. The information is computer-readable instructions, data structures, program modules, or other data. Examples of computer storage media comprise, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD) or other optical storage, magnetic cassettes, magnetic tape, magnetic disk storage or other magnetic storage devices, or any other non-transmission media that are used to store information that is accessed by computing devices. According to the definition herein, computer-readable media does not comprise transitory media, such as modulated data signals and carrier waves.

Further, terms "include", "comprise" or their any other variations are intended to encompass non-exclusive composition, so that a process, method, product or device comprising a series of factors comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

One skilled in the art should understand that, in some cases, the embodiments of the present disclosure are provided as a method, a system, or a computer program product. Therefore, in some cases, embodiments of the present disclosure take the form of entirely hardware embodiments, entirely software embodiments or embodiments containing both hardware and software elements. Moreover, the present disclosure is in a form of one or more computer program products containing the computer-executable codes which are implemented in the computer-executable storage medium (comprising but not limited to disks, CD-ROM, optical disks, etc.).

The above are only examples of this disclosure, and are not used to limit this disclosure. For those skilled in the art, this disclosure has various modifications and changes. Any modifications, equivalent replacements, or improvements made within the spirit and principle of the present disclosure shall be comprised in the scope of the claims of the present disclosure.

What is claimed is:

1. A wireless networking method for an air conditioning system, comprising:
    obtaining, by an outdoor unit, a plurality of blank cards corresponding to target devices one-to-one, the target devices comprising the outdoor unit and a device to be networked;
    punching, with a mechanical port of the outdoor unit, the plurality of the blank cards according to a first identification information of the outdoor unit to generate a plurality of punched cards with the same punched card code, wherein the punched card code is used to represent the first identification information;
    reading, by the outdoor unit of the air conditioning system, a punched card to obtain first identification information of the outdoor unit represented by the punched card code on the punched card;
    acquiring, by the outdoor unit, a connection request to connect to a wireless local area network (LAN) of the outdoor unit, which is sent by the device to be networked;
    obtaining, by the outdoor unit, second identification information contained in the connection request according to the connection request, wherein the device to be networked obtains the second identification information via the punched card; and
    connecting, by the outdoor unit, the device to be networked to the wireless LAN if it is verified that the second identification information matches with the first identification information.

2. The wireless networking method according to claim 1, further comprising, after reading the punched card by the outdoor unit of the air conditioning system:
    generating, by the outdoor unit, the wireless LAN corresponding to the first identification information according to the first identification information.

3. The wireless networking method according to claim 1, wherein connecting, by the outdoor unit, the device to be networked to the wireless LAN if it is verified that the second identification information matches with the first identification information comprises:
    connecting, by the outdoor unit, the device to be networked to the wireless LAN if it is verified that the second identification information is the same as the first identification information.

4. The wireless networking method according to claim 3, wherein the device to be networked comprises a plurality of sub-devices, and connecting, by the outdoor unit, the device to be networked to the wireless LAN if it is verified that the second identification information is the same as the first identification information comprises:
    sequentially determining, by the outdoor unit, whether the second identification information of the plurality of sub-devices is the same as the first identification information; and
    sequentially connecting the plurality of sub-devices to the wireless LAN if it is verified that the second identification information of the plurality of sub-devices is the same as the first identification information.

5. A wireless networking method for an air conditioning system, comprising:
    obtaining, by an outdoor unit of the air conditioning system, a plurality of blank cards corresponding to target devices one-to-one, the target devices comprising the outdoor unit and a device to be networked of the air conditioning system;
    punching, with a mechanical port of the outdoor unit, the plurality of the blank cards according to a first identification information of the outdoor unit to generate a plurality of punched cards with the same punched card code, wherein the punched card code is used to represent the first identification information;
    reading, by the device to be networked of the air conditioning system, a punched card to obtain the first identification information represented by the punched card code on the punched card;
    sending, by the device to be networked, a connection request to the wireless LAN of the outdoor unit of the air conditioning system according to the first identification information, wherein the connection request is used to request to connect to the wireless LAN of the outdoor unit, the connection request containing the first identification information; and
    if the outdoor unit verifies that the first identification information matches with the second identification information, connecting the device to be networked to the wireless LAN, wherein the second identification information is identification information of the outdoor unit represented by the punched card code on the punched card and obtained by the outdoor unit reading the punched card.

6. A wireless networking apparatus for an air conditioning system, comprising:
    a processor; and
    a memory coupled to the processor and storing instructions that when executed by the processor, cause the processor to perform a wireless networking method for an air conditioning system based on instructions stored in the memory, the wireless networking method comprising:
        obtaining, by an outdoor unit of the air conditioning system, a plurality of blank cards corresponding to target devices one-to-one, the target devices comprising the outdoor unit and a device to be networked;
        punching, with a mechanical port of the outdoor unit, the plurality of the blank cards according to a first identification information of the outdoor unit to generate a plurality of punched cards with the same punched card code, wherein the punched card code is used to represent the first identification information;

reading, by the outdoor unit of the air conditioning system, a punched card to obtain first identification information of the outdoor unit represented by the punched card code on the punched card;

acquiring, by the outdoor unit, a connection request to connect to a wireless local area network (LAN) of the outdoor unit, which is sent by the device to be networked;

obtaining, by the outdoor unit, second identification information contained in the connection request according to the connection request, wherein the device to be networked obtains the second identification information via the punched card; and connecting, by the outdoor unit, the device to be networked to the wireless LAN if it is verified that the second identification information matches with the first identification information.

7. The wireless networking apparatus according to claim 6, wherein the memory further storing instructions which, when executed by a processor, cause the processor to:

cause the outdoor unit to generate the wireless LAN corresponding to the first identification information according to the first identification information, after reading the punched card by the outdoor unit of the air conditioning system.

8. The wireless networking apparatus according to claim 6, wherein the memory further storing instructions which, when executed by a processor, cause the processor to:

cause the outdoor unit to obtain a plurality of blank cards, wherein the plurality of blank cards correspond to target devices one-to-one, the target devices comprising the outdoor unit and the device to be networked, before reading the punched card by the outdoor unit of the air conditioning system; and cause the outdoor unit to punch the plurality of the blank cards according to the first identification information of the outdoor unit to generate a plurality of punched cards with the same punched card code, wherein the punched card code is used to represent the first identification information.

9. The wireless networking apparatus according to claim 6, wherein connecting the device to be networked to the wireless LAN if it is verified that the second identification information matches with the first identification information comprises:

connecting the device to be networked to the wireless LAN if it is verified that the second identification information is the same as the first identification information.

10. The wireless networking apparatus according to claim 9, wherein the device to be networked comprises a plurality of sub-devices, and connecting the device to be networked to the wireless LAN if it is verified that the second identification information is the same as the first identification information comprises:

sequentially determining whether the second identification information of the plurality of sub-devices is the same as the first identification information; and sequentially connecting the plurality of sub-devices to the wireless LAN if it is verified that the second identification information of the plurality of sub-devices is the same as the first identification information.

11. A wireless networking apparatus for an air conditioning system, comprising:

a processor; and a memory coupled to the processor and storing instructions that when executed by the processor, cause the processor to perform a wireless networking method for an air conditioning system based on instructions stored in the memory, the wireless networking method comprising:

obtaining, by an outdoor unit of the air conditioning system, a plurality of bank cards corresponding to target devices one-to-one, the target devices comprising the outdoor unit be networked of the air conditioning system;

punching, with a mechanical port of the outdoor unit, the plurality of the blank cards according to a first identification information of the outdoor unit to generate a plurality of punched cards with the same punched card code, wherein the punched card code is used to represent the first identification information;

reading, by the device to be networked of the air conditioning system, a punched card to obtain the first identification information represented by the punched card code on the punched card;

sending, by the device to be networked, a connection request to the wireless local area network (LAN) of the outdoor unit of the air conditioning system according to the first identification information, wherein the connection request is used to request to connect to the wireless LAN of the outdoor unit, the connection request containing the first identification information; and if the outdoor unit verifies that the first identification information matches with the second identification information, connecting the device to be networked to the wireless LAN, wherein the second identification information is identification information of the outdoor unit represented by the punched card code on the punched card and obtained by the outdoor unit reading the punched card.

* * * * *